(No Model.)

E. W. EDWARDS.
NUT LOCK.

No. 573,840. Patented Dec. 22, 1896.

Witnesses.
J. F. Coleman
W. K. McCoy

Inventor
Edward W. Edwards
J. C. Fitzgerald
Atty.

UNITED STATES PATENT OFFICE.

EDWARD W. EDWARDS, OF JOHNSTOWN, PENNSYLVANIA.

NUT-LOCK.

SPECIFICATION forming part of Letters Patent No. 573,840, dated December 22, 1896.

Application filed November 13, 1895. Serial No. 568,772. (No model.)

*To all whom it may concern:*

Be it known that I, EDWARD W. EDWARDS, a citizen of the United States, residing at Johnstown, in the county of Cambria, State of Pennsylvania, have invented certain new and useful Improvements in Nut-Locks; and I do hereby declare the following to be a full, clear, and exact description of the invention, such as will enable others skilled in the art to which it appertains to make and use the same.

My invention relates to improvements in nut-locks.

The invention will first be described in connection with the accompanying drawings and then particularly pointed out in the claim.

Figure 1:
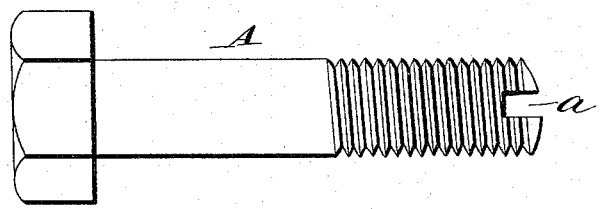
Figure 2:
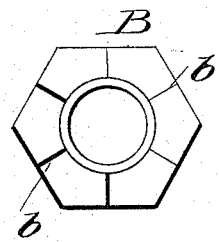
Figure 3:
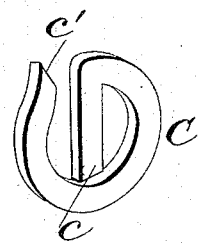
Figure 4:
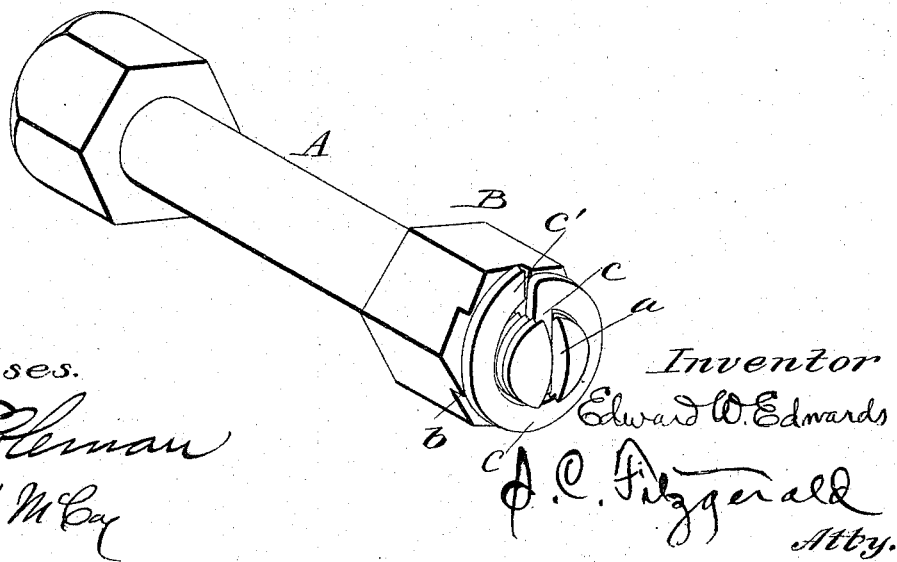

In the drawings, Figure 1 is a side elevation of a bolt arranged to receive a nut-lock embodying my invention. Fig. 2 is a front view of a nut as constructed for use with my improved nut-lock. Fig. 3 is a perspective view of a nut-lock embodying my invention. Fig. 4 is a perspective view of a nut secured on a bolt and held in place by my improved means.

Referring to the drawings, A is a bolt which is provided with a diametrical slot $a$ at its threaded end. On the bolt A is secured a nut B, which has a plurality of ratchet-teeth $b$ on its face. Outside of the nut is placed a nut-lock washer C, which is E-shaped, that is, the washer is open at one side and has one of its ends $c$ projecting diametrically, as shown. This diametric end is placed in the slot $a$ in the end of the bolt and serves to prevent the nut-lock washer from turning on the bolt, and it is held in place by compressing the end of the bolt by means of a few blows from a hammer or otherwise, whereby the size of the slot $a$ is reduced at its outer end and the withdrawal of the washer is prevented. The free end $c'$ of the circular portion of the washer is sprung laterally, so as to form a pawl, which engages the ratchet-teeth $b$ on the nut and prevents the nut from being unscrewed.

Having thus fully described my invention, what I claim as new, and desire to secure by Letters Patent, is—

In a nut-lock, the combination, with a bolt having an open diametrical slot extending entirely across the threaded end of the bolt, of a nut threaded onto the bolt and provided with a plurality of ratchet-teeth on its face, and a nut-lock washer formed of one piece of metal bent into a ring and having one end projecting diametrically into the ring, the other end having a pawl-tooth, the ring portion surrounding and clamping the threaded end of the bolt, the diametrically-projecting end extending into the slot in the bolt and the pawl-tooth engaging any desired ratchet on the nut, substantially as described.

In testimony whereof I affix my signature in presence of two witnesses.

EDWARD W. EDWARDS.

Witnesses:
 H. M. LESLIE,
 GEO. WITT.